(12) United States Patent
Taralika et al.

(10) Patent No.: US 9,871,778 B1
(45) Date of Patent: Jan. 16, 2018

(54) SECURE AUTHENTICATION TO PROVIDE MOBILE ACCESS TO SHARED NETWORK RESOURCES

(71) Applicant: EMC IP Holding Company LLC, Hopkinton, MA (US)

(72) Inventors: Anand Taralika, Sunnyvale, CA (US); Divakara Challa, Sunnyvale, CA (US); Srin Kumar, Sunnyvale, CA (US); Alok Ojha, San Jose, CA (US); Leonard Chung, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/743,242

(22) Filed: Jun. 18, 2015

Related U.S. Application Data

(60) Provisional application No. 62/079,889, filed on Nov. 14, 2014.

(51) Int. Cl.
*H04L 29/06* (2006.01)
*H04W 12/08* (2009.01)

(52) U.S. Cl.
CPC .......... *H04L 63/08* (2013.01); *H04L 63/083* (2013.01); *H04L 63/0853* (2013.01); *H04L 63/10* (2013.01); *H04W 12/08* (2013.01)

(58) Field of Classification Search
CPC ...................................................... G06F 21/34
See application file for complete search history.

(56) References Cited

U.S. PATENT DOCUMENTS

| | | | | |
|---|---|---|---|---|
| 8,537,385 | B2* | 9/2013 | Iizuka | G06F 21/608 358/1.15 |
| 2010/0081417 | A1* | 4/2010 | Hickie | G06F 21/604 455/414.1 |
| 2014/0013444 | A1 | 1/2014 | Gilchrist | |
| 2014/0325627 | A1* | 10/2014 | Fee | H04L 63/0807 726/7 |

* cited by examiner

*Primary Examiner* — William Powers
*Assistant Examiner* — Thanh Le
(74) *Attorney, Agent, or Firm* — Van Pelt, Yi & James LLP

(57) ABSTRACT

Techniques to perform secure authentication to provide mobile access to shared content are disclosed. In various embodiments, a user credential associated with a request to access content is received at a connector node from a mobile application running on a mobile device. The user credential is used to create at the connector node a secure credential token that includes the user credential. The secure credential token is used to provide to the mobile application on the mobile device, via the connector node, access to content on two or more servers residing on a protected network with which the user credential is associated.

20 Claims, 8 Drawing Sheets

SECURE AUTHENTICATION TO PROVIDE MOBILE ACCESS TO SHARED NETWORK RESOURCES

CROSS REFERENCE TO OTHER APPLICATIONS

This application claims priority to U.S. Provisional Patent Application No. 62/079,889 entitled filed SECURE MOBILE ACCESS TO SHARED NETWORK RESOURCES, filed Nov. 14, 2014, which is incorporated herein by reference for all purposes.

BACKGROUND OF THE TECHNOLOGY

Enterprise content typically resides in different places like end user devices, home directories, file shares, and Enterprise Content Management systems such as Microsoft's™ SharePoint™. Increasingly, business users have a need to access enterprise content via mobile devices. Unified mobile access to enterprise content residing in different places, such as end user devices, home directories, file shares, and SharePoint™ etc., may be needed by business users. Enterprises may desire to maintain control over the access via mobile devices of content that resides on an enterprise network.

BRIEF DESCRIPTION OF THE DRAWINGS

Various embodiments of the invention are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A mobile solution to provide secure, unified access to network-based resources is disclosed. In various embodiments, a mobile app and associated infrastructure are used to provide secure access to network-based resources, such as files residing on end user devices on an enterprise or other network, home directories, files shares, and/or SharePoint-accessible content. In various embodiments, an administrator may configure one or more policies to be enforced with respect to mobile access to enterprise content. Policies may be enforced at one or more of three layers, e.g., the enterprise server, a secure connector to which the mobile device connects to access the enterprise server, and a mobile app running on the mobile device itself.

Figure 1:
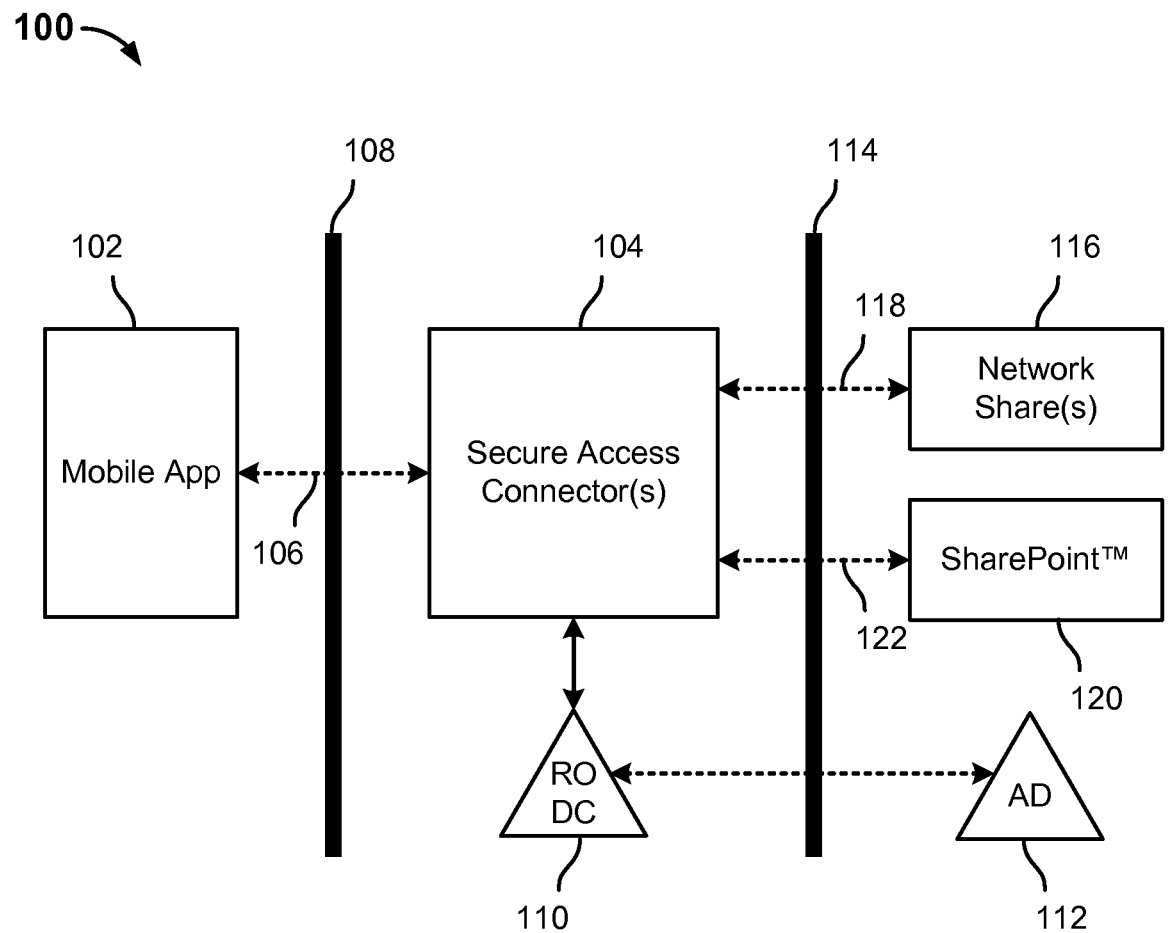
FIG. 1 is a block diagram illustrating an example embodiment of a system and architecture to provide secure mobile access to network resources.

FIG. 1 is a block diagram illustrating an example embodiment of a system and architecture to provide secure mobile access to network resources. In the example shown, the system and architecture 100 includes a mobile app 102 running on a mobile device, such as a mobile "smart" phone or tablet. The mobile app 102 in various embodiments provides secure mobile access to network resources, such as network shares and SharePoint™ libraries, by communicating via a connection 106 with one or more secure access connectors 104, e.g., using a proprietary or other API. In the example shown, the secure access connector(s) 104 are located behind a first firewall 108. A user may be authenticated using based on their enterprise network credentials (e.g., domain username and password), in this example by using an optional "read only" copy 110 of the enterprises Active Directory 112. In some embodiments, optional "read only" Active Directory copy 110 is included for security reasons.

Once authenticated, a user may access network resources, such as files or other content stored on servers that exist on an enterprise or other private network behind a second firewall 114.

For example, network shares 116 may be accessed via Server Message Block (SMB) or other protocol communications sent via a connection 118. The user's enterprise network credentials may be presented to gain such access, enabling the file or other servers on which shared resources are stored to enforce access control list (ACL) based or other access controls with respect to requested resources. For example, a user who is afforded only "read only" access to a requested file may be permitted to open a "read only" copy of the file, but would not be permitted to update the file as store on the file server.

In various embodiments, secure mobile access to home directories, file shares, etc. may be provided with respect to any storage that supports the Server Message Block (SMB) protocol, such as EMC Isilon™ and VNX™ storage products. Users can create, edit and save files on the network share from their mobile devices. Users can also mark files for offline access.

Similarly, access to content accessible via SharePoint 120, such as SharePoint 2010 and SharePoint 2013 sites, sub-sites and document libraries, may be provided via communications between the secure access connector(s) 104 and SharePoint 120 via a connection 122, e.g., using the SharePoint API, for example.

In some embodiments, metadata reflecting the requesting user's rights with respect to a file or other object may be provided to the secure access connector(s) 104 and/or mobile app 102 to enable a user experience that is consistent with the user's access rights to be provided. For example, if the user has only "read only" rights, the file may be opened and displayed by mobile app 102 on the mobile device using a "viewer" or other interface (e.g., app) that does not provide an ability to edit. As another example, if SharePoint 120 requires the user to check out a file before being able to edit and the file has not (yet) been checked out by the user, the mobile app 102 may display the content in a viewer, as opposed to an app that provides the user with the ability to edit the content.

In various embodiments, users access their network shares using their Windows Domain credentials. The secure credential technology makes all subsequent access seamless with behind the scenes authentication. An administrator console enables administrators to configure and/or publish network shares, manage users and groups, and configure mobile device policies.

In various embodiments, mobile app 102 enables SharePoint documents to be created, edited, and saved from mobile devices. In addition, in some embodiments mobile app 102 supports SharePoint specific functionality like check-in and check-out of documents. Users can also mark files for offline access.

In some embodiments, an administrator may configure one or more mobile access policies to be enforced at secure access connector(s) 104, such as to limit access based on user, device, time of day, location, etc.

In some embodiments, an administrator may configure secure access connector(s) 104 and/or mobile app 102 to provide access via mobile app 102 to shared content in a manner determined at least in part based on policies stored and enforced at secure access connector(s) 104. For example, in some embodiments an administrator may define one or more policies that specify "bookmarks" or other data identifying a subset of shared content that is to be made available via mobile app 102. For example, a user's credentials may be used to determine, based on one or more policies, a subset of resources that would be available to the user if logged in to the network directly (e.g., on premises, via VPN), and access to only that subset of resources would be made available via mobile app 102. Policies may be defined by user, group, or other user association. Such an approach in various embodiments enables the user to be presented via mobile app 102 only with those shared resources that the user is most likely to desire to have mobile access, enabling a representation of only that subset of content to be displayed in a navigable interface of mobile app 102, for example. This approach may enable the user to have more meaningful and quick access to such content, since the desired content will not be obfuscated, at least potentially, by shared content to which the user is not likely to want to have access via mobile app 102.

Figure 2:
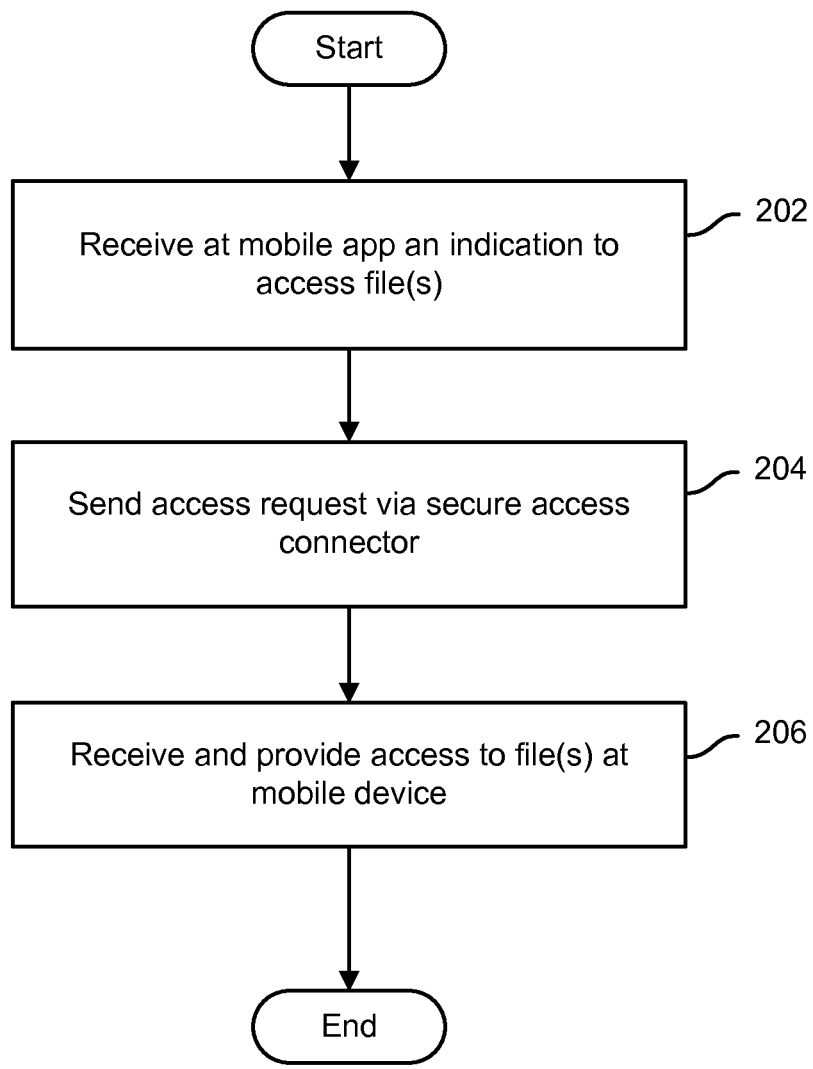
FIG. 2 is a flow chart illustrating an example embodiment of a process to access files on an enterprise or other internal network.

FIG. 2 is a flow chart illustrating an example embodiment of a process to access files on an enterprise or other internal network. In various embodiments, the process of FIG. 2 may be implemented by a mobile device and/or a mobile app running on a mobile device, such as mobile app 102 of FIG. 1. In the example shown, an indication is received at a mobile app to access one or more files stored on an enterprise or other remote, non-public network (202). For example, a user of a mobile device may have launched a mobile app, such as mobile app 102, associated with accessing content on the enterprise network, and indicated a desire to access specific content, such as by selecting at the mobile device, via a user interface, a representation of file, folder, or other logical container. An access request is sent via a secure access connector to obtain access to the file or other content (204). For example, a mobile app such as mobile app 102 of Figure may send a request via secure access connector(s) 104 to access a network share on network shares 116 of FIG. 1 or a SharePoint™ content stored on SharePoint™ server 120. The requested files/folder(s) are received at the mobile device and access is provided (206), e.g., via a navigation interface, a viewer, and/or a content creation/editing app or other interface.

In various embodiments, access may be provided in a manner indicated by one or more of an access privilege of a user of the mobile device with respect to the content and/or one or more policies stored at the secure access connector. For example, metadata reflecting one or both of the access privilege(s) and the applicable policy(ies), if any, may be sent down to the mobile device, and a behavior of the mobile app with respect to the content may be determined at least in party by such metadata. For example, content to which the user has "read only" access may be displayed by the mobile app in a viewer interface, not an editing interface. Or, in another example, a policy reflecting a time of day, geolocation, or other restriction on mobile access to the content may be indicated by the metadata and enforced by the mobile app.

Figure 3:
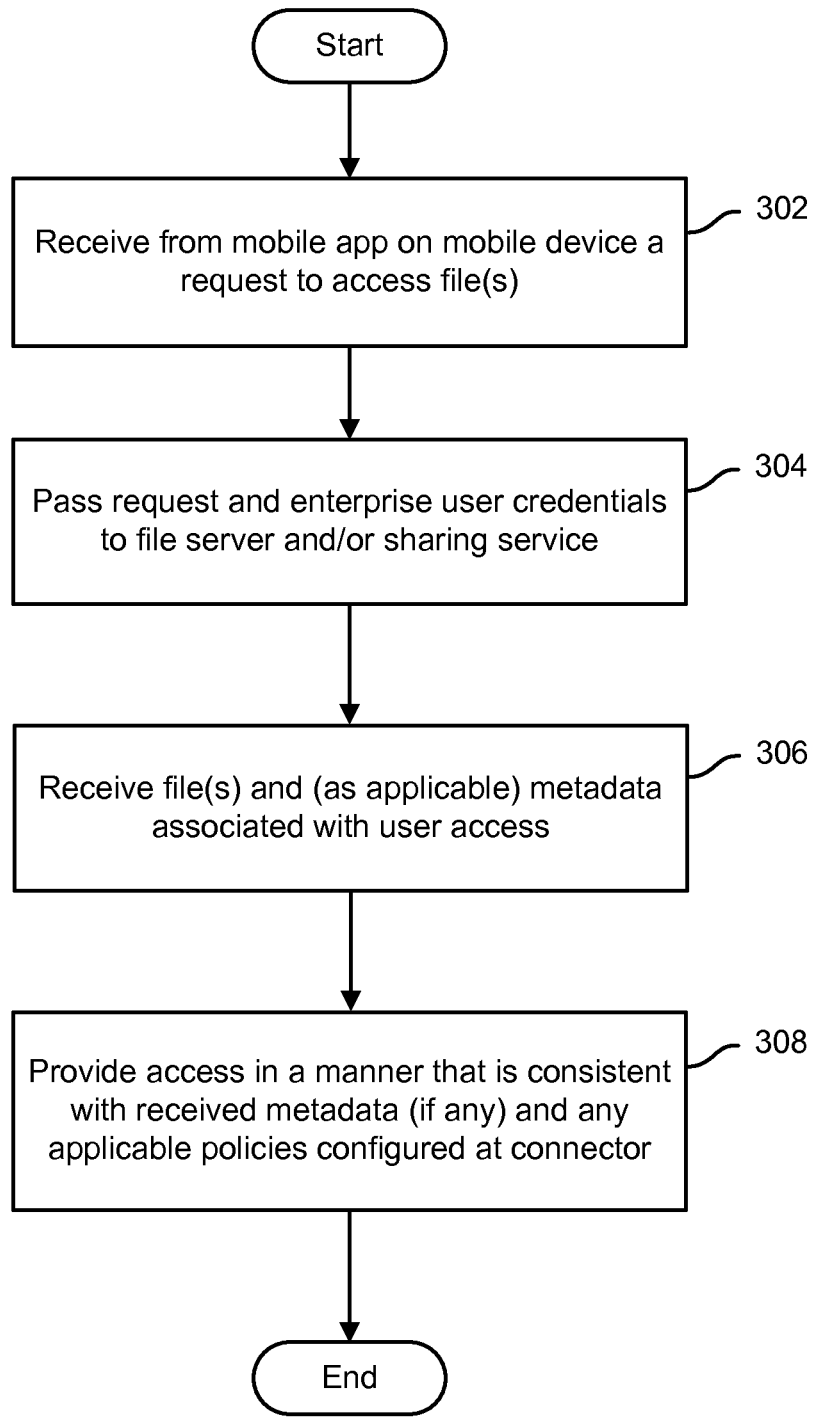
FIG. 3 is a flow chart illustrating an example embodiment of a process to provide access to files on an enterprise or other internal network.

FIG. 3 is a flow chart illustrating an example embodiment of a process to provide access to files on an enterprise or other internal network. In various embodiments, the process of FIG. 3 may be implemented by a secure access connector configured to enable mobile devices to connect to and obtain files or other resources from servers on an enterprise or other non-public network, such as secure access connector(s) 104 of FIG. 1. In the example shown, a request to access content stored on an enterprise network is received from a mobile device (302). In the case of a first access request, the request may include user credentials associated with the request. The request and enterprise user credentials associated with the request are passed to the file server or other service with which the request is associated (304). In some embodiments, the user credentials may be embodied in a secure token that is stored at the secure connector and/or at the mobile device, and which is presented to enterprise services to authenticate the user, without requiring that the user present the user's credential to multiple services. The requested file(s) and, if applicable, associated metadata are received at the secure connector (306). For example, a requested file along with metadata indicating that the requesting user has "read only" access to the file may be received. Access to the file or other content is provided, via the mobile app on the mobile device, in a manner indicated by the metadata, if any, and/or any policies the secure connector may have been configured to enforce (308). For example, if the metadata from the server indicated the user had read only access, the content may be provided to a viewer app on the mobile device, or provided to the requesting app with metadata indicating access is limited to read only access. Or, in another example, if access is limited to a certain geography, metadata defining that restriction may be provided to the mobile app, which in various embodiments may be configured to read the metadata, interpret the metadata to determine the restriction(s) to be enforced, and enforce the restriction(s).

Figure 4:
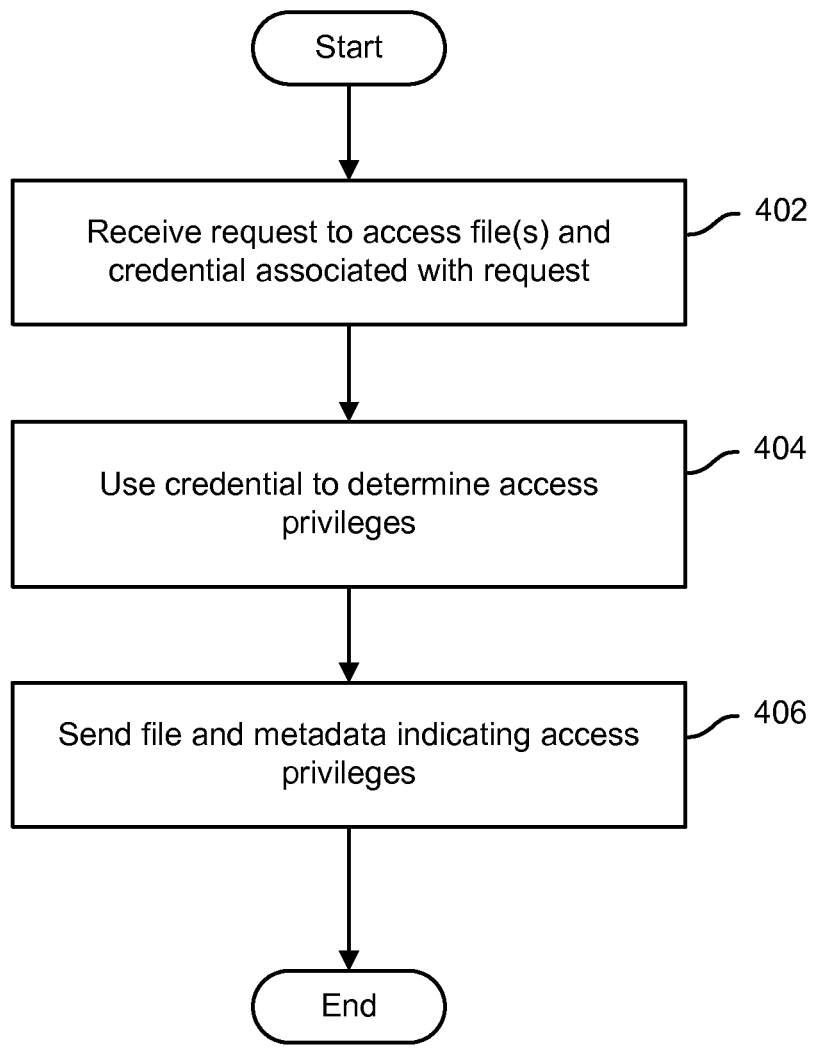
FIG. 4 is a flow chart illustrating an example embodiment of a process to provide access to files.

FIG. 4 is a flow chart illustrating an example embodiment of a process to provide access to files. In various embodiments, the process of FIG. 4 may be implemented by an enterprise network server, such as network share(s) 116 and/or SharePoint™ server 120 of FIG. 1. In the example shown, a request to access content is received, along with a secure token or other representation of user credentials associated with the request (402). The user credentials are used to determine the requesting user's access privileges with respect to the requested content (404). For example, the server processing the request may use the credentials and an access control list (ACL) or other set of access privilege data to determine the user's privileges. The requested file(s) or other content and metadata indicating the user's access privileges with respect to the content are returned in a response to the request (406). As noted above, in various embodiments one or both of the secure access connector and the mobile app may be configured to enforce the access privilege based at least in part on the metadata included in the response.

Figure 5:
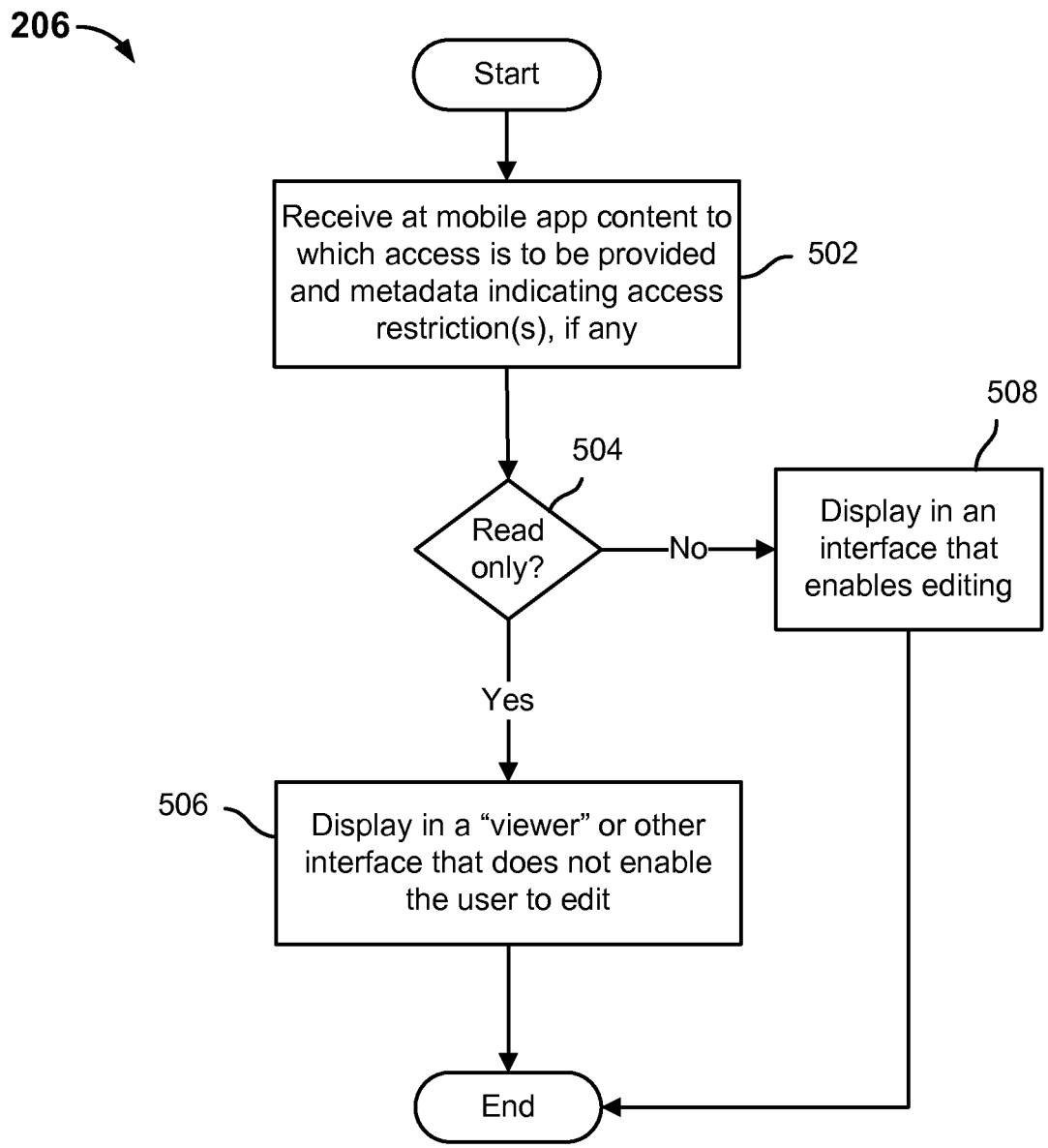
FIG. 5 is a flow chart illustrating an example embodiment of a process to provide access to files in a manner consistent with an access privilege.

FIG. 5 is a flow chart illustrating an example embodiment of a process to provide access to files in a manner consistent with an access privilege. In various embodiments, the process of FIG. 2 may be implemented by a mobile device and/or a mobile app running on a mobile device, such as mobile app 102 of FIG. 1. In some embodiments, step 206 of the process of FIG. 2 may include the process of FIG. 5. In the example shown, content to which access is to be provided is received by a mobile app, along with associated metadata indicating access restrictions/privileges, if any (502). If the metadata indicates the user is limited to "read only" access (504), the content is displayed in a viewer or other app that does not enable a user to edit (506). If the user is not limited to read only access to the content (504), the content is displayed in an app or interface that enables the user to edit the content (508).

Figure 6:
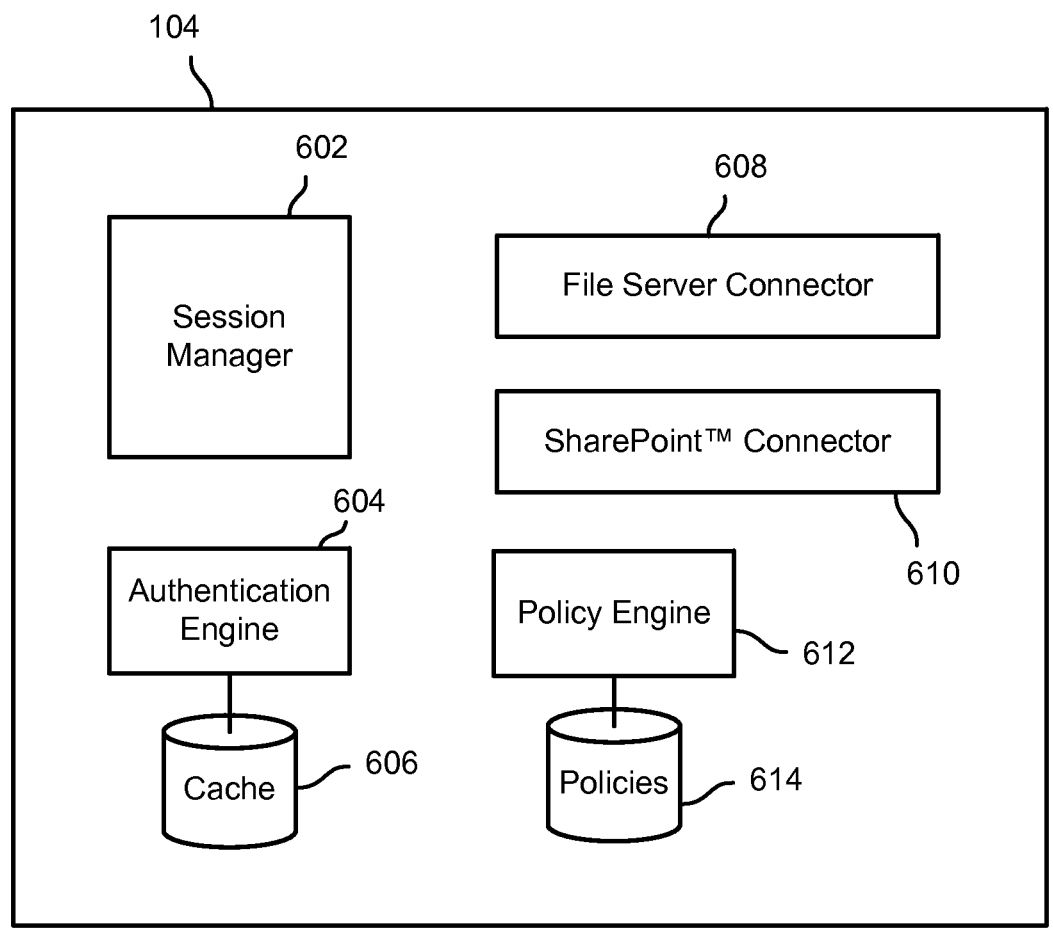
FIG. 6 is a block diagram illustrating an example embodiment of a secure access connector system.

FIG. 6 is a block diagram illustrating an example embodiment of a secure access connector system. In various embodiments, the system of FIG. 6 may be used to implement a secure access connector(s) 104 of FIG. 1. In the example shown, the secure access connector 104 includes a session manager 602 configured to manage session-based connections between each of one or more mobile devices and the secure access connector 104. An authentication engine 604 receives a user credential, e.g., a fully-qualified user name and an associated password, and stores the credentials in a secure token in a local cache or other in memory store 606. In various embodiments, once a user has provided the user's credentials once, at initial log in, access is provided to services on the enterprise network using the user's credentials as stored at the secure access connector, e.g., in cache 606. In this example, the secure access connector system 104 includes a service-specific connector for each service to which access is provided. In the example shown, a file sharing service connector 608 and a SharePoint™ connector 610 are included.

A policy engine 612 enforces policies stored in a policy data store 614. In various embodiments, an administrative interface not shown in FIG. 6, such as a web-based or other network-access interface, is provided and used by a network administrator to define policies and deploy them to be stored in policy data store 614 and enforced by policy engine 612. In various embodiments, policies may be enforced by the secure access connector, e.g., by adjusting the behavior of the connectors 608, 610 or other components of the secure access connector system 104, and/or by providing instructions to the mobile device, such as in the form of metadata sent to the mobile device in connection with providing content requested by the device.

In various embodiments, user credentials may be received at a secure access connector, such as access connector 104 of FIGS. 1 and 6, and used to authenticate a user. For example, referring to FIG. 1, in some embodiments, mobile app 102 may be configured to prompt the user to enter a username and password, which may then be sent to the secure access connector 104 via connection 106. Secure access connector 104 may be configured to use Active Directory (e.g., read only copy 110 and/or primary directory 112) to authenticate the user. Once authenticated, the user's credentials may be stored at the secure access connector 104, e.g., in cache 606 of FIG. 6, and used to provide to the user, via the mobile app 102, access to content stored by services such as network shares 116 and SharePoint™ server 120, without requiring the user to present the user's credentials again/separately in the context of each specific service.

Figure 7:
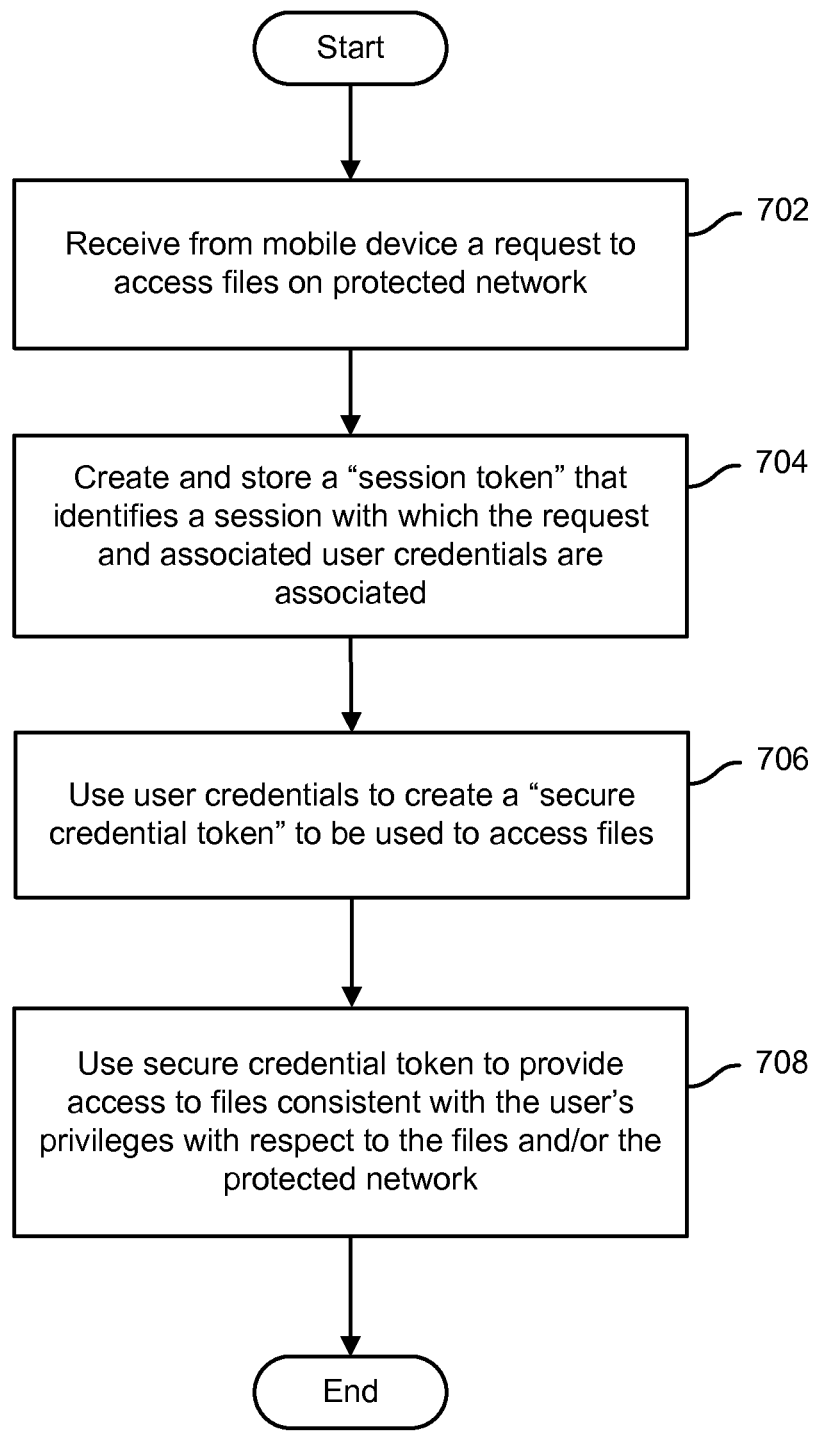
FIG. 7 is a flow chart illustrating an example embodiment of a process to provide secure access to content associated with multiple services using user credentials presented only once.

FIG. 7 is a flow chart illustrating an example embodiment of a process to provide secure access to content associated with multiple services using user credentials presented only once. In various embodiments, the process of FIG. 7 may be implemented by a secure access connector, such as secure access connector 104 of FIGS. 1 and 6. In the example shown, a request to access files from a server on an enterprise or other non-public network is received (702), e.g., at a secure access connector such as connector 104 of FIGS. 1 and 6. In various embodiments, the request may include a user credential, such as a username and password, or may be associated with a previously-received credential. A "session token" that identifies a session with which the request and associated credentials is created and stored (704). The session token may be used to store at the access connector, e.g., in a cache such as cache 606 of FIG. 6, and to associate with the session a copy of the user credentials. The user credentials are used to create a "secure credential token" to be used to provide access to files or other content (706). In various embodiments, the secure credential token comprises an encrypted string that includes the following information, encrypted using a self-signed certificate stored on the connector: user credentials (e.g., fully-qualified username and password); device UUID; date-time stamp in UTC indicating when token was created; and a duration through which the secure credential token is valid. The secure credential token is used to provide access to files, in a manner that is consistent with the user's privileges with respect to the files and/or the protected network (708). For example, the secure credential token may be presented to one or more servers comprising an enterprise or other non-public network, to authenticate the user to the respective server(s) without requiring the user to reenter the user's username and password, and to enable the server and/or associated infrastructure to enforce access control list (ACL) and/or other access policies applicable to content stored on the server.

In some embodiments, the secure credential token may be presented to enterprise or other servers by the secure access connector on behalf of a mobile device being used to access content. In some embodiments, the secure credential token may be provided to the mobile application and/or mobile device, to enable the mobile application and/or device to present the secure credential token to a service to which access is provided via the access connector. In various embodiments, storing the credentials on the mobile device in the form of a secure credential token encrypted by the access connector prevents the credentials from being obtained by unauthorized users from the token as stored on the mobile device.

Figure 8:
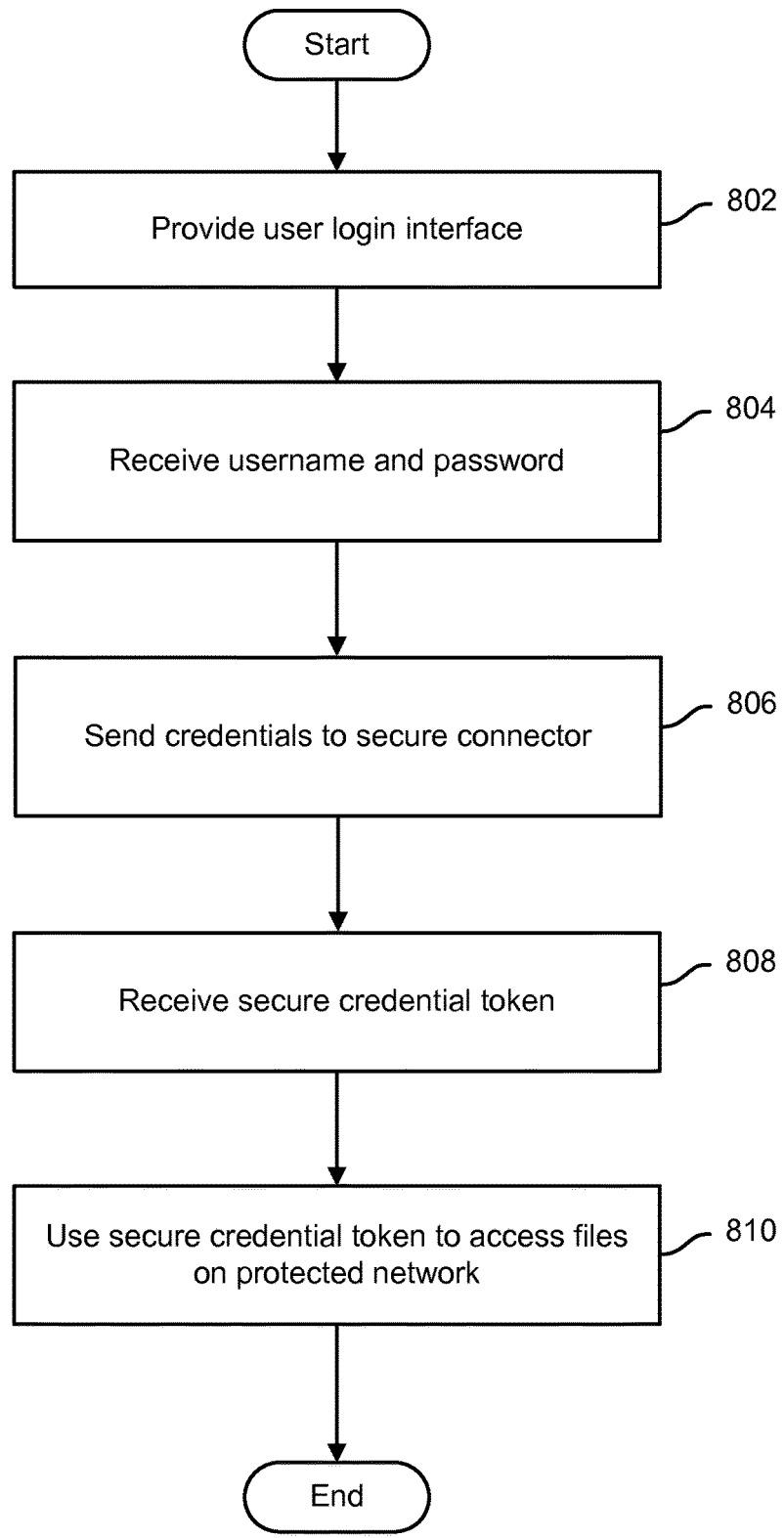
FIG. 8 is a flow chart illustrating an example embodiment of a process to provide mobile access to content.

FIG. 8 is a flow chart illustrating an example embodiment of a process to provide mobile access to content. In various embodiments, the process of FIG. 8 may be implemented by a mobile device and/or a mobile app running on a mobile device, such as mobile app 102 of FIG. 1. In the example shown, a user login interface is presented, e.g., an interface prompting a user to enter a username and password (802). A username and password are received via the interface (804). The credentials are sent to a secure access connector, such as secure access connector 104 of FIGS. 1 and 6 (806). A secure credential token is received (808), e.g., from the secure access connector. The secure credential token is used to access files on an associated enterprise or other non-public network (810). For example, upon receiving a user input to access a specific content item, a corresponding request that includes the secure credential token may be sent via the secure access connector to a remote server on which the requested content item is stored, such as network shares 116 and/or SharePoint™ server 120 in the example shown in FIG. 1.

Using techniques described herein, secure mobile access may be provided to content stored on an enterprise or other non-public network, using the same infrastructure that may be in place to provide secure access to such content from nodes on the enterprise or other network, such as computers on the same local or wide area network, remote computers that have connected via a virtual private network (VPN), etc. A "single sign on" feature may be provided by caching user credentials and providing a secure credential token to be used to present user credentials to services on the enterprise or other protected network, requiring the mobile user to present the user's credentials only once per access session and/or portion thereof.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing mobile access to content, comprising:
   receiving at a connector node, from a mobile application running on a mobile device, a user credential associated with a request to access content;
   authenticating a user associated with the request using the user credential and a copy of an active directory stored at the connector node, wherein the active directory is stored at a location separate from the connector node;
   using the user credential to create at the connector node a secure credential token that includes the user credential;
   using the secure credential token to provide to the mobile application running on the mobile device, via the connector node, access to content on two or more servers in a manner that is consistent with privileges associated with the authenticated user, wherein the two or more servers are separate from the connector node and residing on a protected network with which the user credential is associated; and
   providing metadata to the mobile device, wherein the mobile device is configured to provide access to the content based on one or more restrictions included in the metadata, wherein the metadata at least indicates a type of application that may access the content.

2. The method of claim 1, wherein the user credential comprises a username and password.

3. The method of claim 1, wherein the connector node is configured to authenticate a user with which the request access content, based at least in part on the user credential and a user directory associated with the protected network.

4. The method of claim 1, wherein the connector node is configured to store the user credential in memory at the connector node.

5. The method of claim 4, wherein the connector node is configured to associate the user credential as stored at the connector node with a session with which the request to access content is associated.

6. The method of claim 1, wherein the secure credential token includes one or more of the following: the user credential; a device UUID of the mobile device; a date-time stamp indicating when token was created; and a duration through which the secure credential token is valid.

7. The method of claim 1, wherein using the secure credential token to provide access to the mobile application on the mobile device includes providing the secure credential token to the mobile application on the mobile device.

8. The method of claim 1, wherein using the secure credential token to provide access to the mobile application on the mobile device includes presenting the secure credential token to one or more of the two or more servers on behalf of the mobile application running on the mobile device.

9. The method of claim 1, wherein the two or more servers are configured to use the secure credential token to determine an access privilege of a user with which the secure credential token is associated.

10. The method of claim 9, wherein the access privilege is determined based at least in part on an access control list (ACL).

11. A system to provide mobile access to content, comprising:
    a communication interface; and
    a hardware processor coupled to the communication interface and configured to:
      receive at a connector node via the communication interface, from a mobile application running on a mobile device, a user credential associated with a request to access content;
      authenticate a user associated with the request using the user credential and a copy of an active directory stored at the connector node, wherein the active directory is stored at a location separate from the connector node;
      use the user credential to create at the connector node a secure credential token that includes the user credential;
      use the secure credential token to provide to the mobile application on the mobile device, via the connector node, access to content on two or more servers in a manner that is consistent with privileges associated with the authenticated user, wherein the two or more servers are separate from the connector node and residing on a protected network with which the user credential is associated; and
      provide metadata to the mobile device, wherein the mobile device is configured to provide access to the content based on one or more restrictions included in the metadata, wherein the metadata at least indicates a type of application that may access the content.

12. The system of claim 11, wherein the user credential comprises a username and password.

13. The system of claim 11, wherein the connector node is configured to authenticate a user with which the request access content, based at least in part on the user credential and a user directory associated with the protected network.

14. The system of claim 11, wherein the connector node is configured to store the user credential in memory at the connector node.

15. The system of claim 14, wherein the connector node is configured to associate the user credential as stored at the connector node with a session with which the request to access content is associated.

16. The system of claim 11, wherein the secure credential token includes one or more of the following: the user credential; a device UUID of the mobile device; a date-time stamp indicating when token was created; and a duration through which the secure credential token is valid.

17. The system of claim 11, wherein using the secure credential token to provide access to the mobile application on the mobile device includes providing the secure credential token to the mobile application on the mobile device.

18. The system of claim 11, wherein using the secure credential token to provide access to the mobile application on the mobile device includes presenting the secure credential token to one or more of the two or more servers on behalf of the mobile application running on the mobile device.

19. The system of claim 11, wherein the two or more servers are configured to use the secure credential token to determine an access privilege of a user with which the secure credential token is associated.

20. A computer program product to provide mobile access to content, the computer program product being embodied in a non-transitory computer readable storage medium and comprising computer instructions for:

receiving at a connector node, from a mobile application running on a mobile device, a user credential associated with a request to access content;

authenticating a user associated with the request using the user credential and a copy of an active directory stored at the connector node, wherein the active directory is stored at a location separate from the connector node;

using the user credential to create at the connector node a secure credential token includes the user credential;

using the secure credential token to provide to the mobile application on the mobile device, via the connector node, access to content on two or more servers in a manner that is consistent with privileges associated with the authenticated user, wherein the two or more servers are separate from the connector node and residing on a protected network with which the user credential is associated; and providing metadata to the mobile device, wherein the mobile device is configured to provide access to the content based on one or more restrictions included in the metadata, wherein the metadata at least indicates a type of application that may access the content.

* * * * *